United States Patent [19]

Michels et al.

[11] Patent Number: 5,387,640

[45] Date of Patent: * Feb. 7, 1995

[54] FLUORINE-CONTAINING COPOLYMERS AND AQUEOUS DISPERSIONS PREPARED THEREFROM

[75] Inventors: Gisbert Michels, Cologne; Hans-Albert Ehlert, Leverkusen, both of Germany

[73] Assignee: Bayer Aktiengesellschaft, Leverkusen, Germany

[*] Notice: The portion of the term of this patent subsequent to Sep. 21, 2010 has been disclaimed.

[21] Appl. No.: 204,842

[22] Filed: Mar. 2, 1994

Related U.S. Application Data

[63] Continuation-in-part of Ser. No. 4,347, Jan. 14, 1993, abandoned.

[30] Foreign Application Priority Data

Jan. 22, 1992 [DE] Germany .............. 4201603

[51] Int. Cl.$^6$ .................... C08L 27/12; C08F 18/20
[52] U.S. Cl. ................ 524/544; 526/243; 526/245
[58] Field of Search ............. 524/544; 526/243, 245

[56] References Cited

U.S. PATENT DOCUMENTS 2,398,569  4/1946  Widmer .

(List continued on next page.)

FOREIGN PATENT DOCUMENTS

| 3143945 | 6/1991 | Japan ................... 525/200 |
| 1010539 | 11/1965 | United Kingdom ........... 525/200 |
| 1011612 | 12/1965 | United Kingdom ........... 524/520 |
| 1411103 | 10/1975 | United Kingdom ........... 525/200 |
| 1454906 | 11/1976 | United Kingdom . |

*Primary Examiner*—Joseph L. Schofer
*Assistant Examiner*—N. Sarofim
*Attorney, Agent, or Firm*—Sprung Horn Kramer & Woods

[57] ABSTRACT

Finishers for textiles, leather, paper and mineral substrates consisting of fluorine-containing copolymers and aqueous dispersions prepared therefrom are characterized by the following percentages by weight of the comonomers, relative to the total weight of the copolymers:

a) 60 to 90% by weight of perfluoroalkyl-containing (meth)acrylates of the formula $$C_nF_{2n+1}-X-O-CO-CR^1=CH_2 \qquad (I),$$

b) 1 to 35% by weight of monomers of the formula $$CH_2=CR^4-COO-R^5 \qquad (II)$$

and/or styrene, acrylonitrile, vinyl acetate or vinyl propionate, c) 4 to 25% by weight of monomers of the formula $$CH_2=CR^6-COO+CH-CH_2O\!\!\!+_p R^8 \text{ and} \qquad (III)$$
$$\phantom{CH_2=CR^6-COO+}|\phantom{CH-CH_2O\!\!\!+_p R^8}$$
$$\phantom{CH_2=CR^6-COO+}R^7$$

d) 1 to 15% by weight of monomers of the formula $$CH_2=CR^{11}-COOCH_2CH_2-N(R^9,R^{10}) \qquad (IVa)$$

or $$[CH_2=CR^{11}-COO-CH_2CH_2-N(R^9,R^{10},R^{12})]\text{-} \qquad (IVb)$$
$$\oplus Y\ominus$$

or $$CH_2=CR^{11}-COO-CH_2CH_2-N(R^9,R^{10}). \qquad (IVc)$$
$$\downarrow$$
$$O$$

17 Claims, No Drawings

U.S. PATENT DOCUMENTS

| | | | |
|---|---|---|---|
| 3,462,296 | 8/1969 | Raynolds et al. | 525/200 |
| 3,491,169 | 1/1970 | Raynolds et al. | 525/200 |
| 3,595,944 | 7/1971 | Manning et al. | 525/200 |
| 4,032,495 | 6/1977 | Perromin et al. | 525/200 |
| 4,127,711 | 11/1978 | Lore et al. | |
| 4,366,299 | 12/1982 | Dessaint. | |
| 4,564,561 | 1/1986 | Lore et al. | |
| 4,579,924 | 4/1986 | Schwartz et al. | |
| 4,781,844 | 11/1988 | Kortmann et al. | |
| 4,795,793 | 1/1989 | Amimoto et al. | 525/200 |
| 4,997,893 | 3/1991 | Suling et al. | |
| 5,118,579 | 6/1992 | Aharoni et al. | 525/200 |
| 5,139,879 | 8/1992 | Aharoni et al. | 525/200 |

FLUORINE-CONTAINING COPOLYMERS AND AQUEOUS DISPERSIONS PREPARED THEREFROM

CROSS-REFERENCES TO RELATED APPLICATIONS

This application is a continuation-in-part application of U.S. patent application, Ser. No. 4,347, filed Jan. 14, 1993, now abandoned.

This application is related to U.S. patent application. Ser. No. 4,348, filed Jan. 14, 1993, meanwhile maturated into U.S. patent No. 5,247,008 of Sep. 21, 1993.

BACKGROUND OF THE INVENTION

1. Field of the Invention

The invention relates to copolymers consisting of monomers containing perfluoroalkyl groups, hydrophilic, ionic and non-ionic monomers and further comonomers. The invention furthermore relates to aqueous dispersions of these fluorine-containing copolymers, to the preparation of the copolymers and their aqueous dispersions and to their use for the oil-, soil- and water-repellant finishing of texthe materials, leather, paper and mineral substrates.

2. Description of the Related Art

It is known from U.S. Pat. Nos. 4,127,711, 4,564,561, 4,366,299 and 4,579,924 that copolymers can be prepared from monomers containing perfluoroalkyl groups, hydrophilic, ionic or non-ionic monomers and, if desired, further comonomers.

The disadvantage is that either the dispersions prepared from these copolymers contain solvents which, upon application, require special safety, precautions due to the relatively low flash point, or the dispersions can only be prepared with the aid of emulsifiers, which, on the other hand, in turn reduce the desired effects, or a very high fluorine content is necessary for ensuring high oil and water repellency, which, on the other hand, leads to harshening of the substrates finished therewith.

Accordingly, the object of the invention is to develop highly effective oil and water repellent finishing agents for texthes, leather, paper and mineral substrates which can be prepared as an aqueous dispersion without using emulsifiers. Rather effective finishing agents for texthes, leather, paper and mineral substrates of the type of fluorine containing copolymers and aqueous dispersions prepared therefrom are known from above cited U.S. Pat. No. 5,247,008.

In detail, these are fluorine-containing copolymers and aqueous dispersions prepared therefrom containing 5 to 50% by weight relative to the total weight of the dispersions, of ingredients other than water (solid content), wherein the copolymers contain copolymerized comonomers in the following percentages by weight, relative to the total weight of the copolymers:

a) 45-75% by weight of (meth)acrylates containing perfluoroalkyl groups, of the formula $$C_nF_{2n+1}—X—OCO—CR^1=CH_2 \quad (I)$$

in which n represents a number from 4–12, $R^1$ denotes hydrogen or methyl and

X represents $—(—CH_2—)_m—$, $—SO_2—NR^2—CH_2—CHR^3$ or $—O—(—CH_2—)_m—$, where m denotes a number from 1 to 4, $R^2$ represents $C_1-C_4$-alkyl and $R^3$ represents hydrogen or methyl, b) 10 to 50% of monomers of the formulae $$CH_2=CH—CO—OR^4 \quad (IIa)$$

and/or $$CH_2=C(CH_3)—CO—OR^{12} \quad (IIb)$$

in which $R^4$ represents a $C_1-C_{22}$-alkyl radical and $R^{12}$ denotes $C_2-C_{22}$-alkyl wherein the monomers (IIa) and/or (IIb) can be completely or partially replaced by one or more monomers of the group consisting of styrene, acrylonitrile, vinyl acetate, vinyl propionate and methyl methacrylate, c) 4–30% of monomers of the formula $$CH_2=CR^5—COO\!+\!CH—CH_2O\!)_{\overline{p}}R^7, \quad (III)$$
$$\phantom{CH_2=CR^5—COO\!+\!}|\phantom{}$$
$$\phantom{CH_2=CR^5—COO\!+\!}R^6$$

in which $R^5$ and $R^6$ independently represent hydrogen or methyl and $R^7$ denotes hydrogen or $C_1-C_8$-alkyl and p represents a number from 1 to 50, and d) 1 to 15% of monomers of the formula $$CH_2=CR^{11}COO—CH_2CH_2—N(R^8,R^9) \quad (IVa)$$

in which $R^8$ and $R^9$ independently of one another denote $C_1-C_4$-alkyl and $R^{11}$ represents hydrogen or methyl, or of monomers of the formula (IVa) in their quaternised form of the formula $$[CH_2=CR^{11}—COO—CH_2CH_2N(R^8,R^9,R^{10})]^{\oplus}Y^{\ominus} \quad (IVb)$$

in which additionally $R^{10}$ denotes $C_1-C_4$-alkyl and

Y represents an equivalent of a mono- to tri-valent anion, or of monomers of the formula (IVa) in their N-oxidised form of the formula $$CH_2=CR^{11}—COO—CH_2CH_2—N(R^9, R^{10}). \quad (IVc)$$
O However, it has been found that further effective finishing agents of this type are those, e.g., wherein the comonomer a) is present in approx. 70% by weight, monomer b) in only approx. 8% by weight, and comonomers c) and d) are adjusted accordingly, and those, e.g., wherein the comonomer a) is present in approx. 77% by weight or more, comonomer b) is present in the range of below 10% by weight up to nearly 20% by weight, and comonomers c) and d) are adjusted accordingly.

SUMMARY OF THE INVENTION

The invention relates to fluorine-containing copolymers and aqueous dispersions prepared therefrom containing 5 to 50% by weight, preferably 10 to 40% by weight, relative to the total weight of the dispersions, of ingredients other than water (solids content), wherein the copolymers contain copolymerized comonomers in the following percentages by weight, relative to the total weight of the copolymers:

a) 60 to 90% by weight of perfluoroalkyl-containing (meth)acrylates of the formula $$C_nF_{2n+1}-X-O-CO-CR^1=CH_2 \qquad (I),$$

b) 1 to 35 of monomers of the formula $$CH_2=CR^4-COO-R^5 \qquad (II)$$

and/or styrene, acrylonitrile, vinyl acetate or vinyl propionate, c) 4 to 25% of monomers of the formula $$CH_2=CR^6-COO+CH-CH_2O\!\!\!+_p\!R^8 \qquad (III)$$
$$\quad\quad\quad\quad\quad\quad\quad\;\; |$$
$$\quad\quad\quad\quad\quad\quad\quad\;\; R^7$$

whereby b) and c) together constitute at least 6% by weight, preferably at least 8% by weight and d) 1 to 15% of monomers of the formula $$CH_2=CR^{11}-COOCH_2CH_2-N(R^9,R^{10}) \qquad (IVa)$$

or, in quaternised form, of the formula $$[CH_2=CR^{11}-COO-CH_2CH_2-N(R^9,R^{10},R^{12})\text{-}]^{\oplus}Y^{\ominus} \qquad (IVb)$$

or, in N-oxidised form, of the formula $$CH_2=CR^{11}-COO-CH_2CH_2-N(R^9,R^{10}) \qquad (IVc)$$
$$\quad\quad\quad\quad\quad\quad\quad\quad\quad\quad\quad\quad\;\; \downarrow$$
$$\quad\quad\quad\quad\quad\quad\quad\quad\quad\quad\quad\quad\;\; O$$

in which formulae n represents a number from 4 to 16, preferably 6 to 14,

X represents $-(-CH_2-)_m-$, $-SO_2-NR^2-CH_2-CHR^3-$ or $-O-(-CH_2-)_m-$, m denoting a number from 1 to 4, $R^1$, $R^3$, $R^4$, $R^6$, $R^7$ and $R^{11}$ represent, independently of one another, hydrogen or methyl, $R^2$, $R^9$, $R^{10}$ and $R^{12}$ denote, independently of one another, $C_1$-$C_4$-alkyl, $R^5$ represents a $C_1$-$C_{22}$-alkyl, preferably $C_1$-$C_8$-alkyl, radical, denotes hydrogen or $C_1$-$C_8$-alkyl, p represents a number from 1 to 50, preferably 3 to 25, and Y represents an equivalent of a mono- to trivalent anion wherefrom the copolymers of U.S. Pat. No. 5,267,008 are disclaimed.

Furthermore, the dispersions prepared from the copolymers are stable even if any solvent content is so low that the resulting flash points are higher than 100° C.

It is further possible for the dispersions to contain additionally extenders known per se for texthe auxiliaries or other fluorine-containing copolymers.

DETAILED DESCRIPTION OF THE INVENTION

The fluorine-containing copolymers consist of the following comonomers incorporated by polymerisation:

60–90% by weight of component a),
1–35% by weight of component b),
4–25% by weight of component c) and
1–15% by weight of component d), all as defined above wherefrom those of U.S. Pat. No. 5,247,008 are disclaimed.

Preferred fluorine-containing copolymers are those with 65–90% by weight of component a),
1–20% by weight of component b),
4–25% by weight of component c) and
1–10% by weight of component d), all as defined above wherefrom those of U.S. Pat. No. 5,247,008 are disclaimed.

Especially preferred fluorine-containing copolymers are those with
>75–90% by weight of component a),
1–<20% by weight of component b)
4–20% by weight of component c) and
1–10% by weight of component d).

Very especially preferred fluorine-containing copolymers are those with
>75–85% by weight of component a),
1–18% by weight of component b),
5–15% by weight of component c) and
1–10% by weight of component d).

Further preferred fluorine-containing copolymers are those with
65–90% by weight of component a),
1–<10% by weight of component b),
4–25% by weight of component c) and
1–10% by weight of component d).

Further especially preferred fluorine-containing copolymers are those with
65–85% by weight of component a),
1–<10% by weight of component b),
5–18% by weight of component c) and
1–10% by weight of component d).

In monomers of the formula (I), n preferably adopts values from 4 to 12, especially preferably 6–14, very especially preferably 6 to 10, and furthermore m preferably adopts the value 2. In monomers of the formula (I), $R^1$ preferably denotes hydrogen.

In monomers of the formula (II), $R^5$ preferably denotes methyl, ethyl, propyl, butyl, hexyl or octyl, stearyl or behenyl.

In monomers of the formula (III), $R^7$ preferably denotes hydrogen and the index p denotes a number from 3 to 25.

Astonishingly, the incorporation of monomers of the formula (III) in which $R^7$ denotes hydrogen and the index p a number from 5 to 9 into the fluorine-containing copolymers according to the invention gives excellent results in texthe and paper finishing.

In monomers of the formula (IVa, b, c), $R^9$ and $R^{10}$ preferably denote methyl. Preferred anions are chloride, acetate, ½ sulphate, aryl- or alkylsulphonate or ⅓ phosphate. Chloride, acetate and phosphate are particularly preferred.

Mixtures of a plurality of the substances falling under the formulae (I), (II), (III) or (IVa, b, c) can also be used in the (meth)acrylate copolymers.

The dispersions according to the invention can additionally contain extenders known per se for texthe auxiliaries or paper auxiliaries known per se: examples of these are:

Melamine condensation products as described, for example, in DE-A 3,800,845 or in U.S. Pat. No. 2,398,569:

aqueous colloidal suspensions of organosiloxanes disclosed for example, in DE-A 3,307,420:

as paper auxiliaries: agents for retention, wet-fastness and sizing.

Additional other (meth)acrylate copolymers containing 5–20% by weight of fluorine may consist of the following comonomers incorporated by polymerisation:
a) 10 to 40% by weight of the formula (I),
b) 20 to 95% by weight of the formula (II) and/or styrene, acrylonitrile, vinyl acetate and vinyl propionate, respectively,
c) 4 to 30% by weight of the formula (III),
d) 1 to 15% by weight of the formula (IVa) or (IVb) or (IVc).

The copolymers for the aqueous dispersions are prepared by free-radical solution polymerisation of monomers (I), (II), (III) and (IVa, b, or c). The solvents used can be ethyl acetate, butyl acetate, acetone, methyl ethyl ketone, methyl isobutyl ketone, ethanol, isopropanol and tert.-butanol. Acetone is preferred. The polymerisation can be carried out batchwise or continuously. Of the batchwise procedures, the batch process and the feed process may be mentioned.

The initiators used for the polymerisation are flee-radical formers, such as, 2.2' azo(bis-methylbutyronitrile), for example, azo compounds or peroxides. Azoisobutyronitrile, azoisovaleronitrile and tert.-butyl perpivalate are preferred.

For regulating the molecular weight, chain-transfer agents, such as, for example, dodecanethiol, can be used.

The polymerisation temperature is 40 to 100° C., preferably 50 to 90° C.

If desired, the polymers can be obtained by removing the solvents, for example by evaporation.

Aqueous dispersions of the fluorine-containing copolymers are prepared by adding water to the solution of the copolymers after their preparation and distilling off at least a portion of the solvent. If monomer (IVa) is used for preparing the copolymers, a neutralising agent, preferably hydrochloric acid, phosphoric acid or acetic acid, is added to the copolymer solution together with the water.

The solvents can be removed, for example, at elevated temperature (40°–90° C.) in vacuo. In principle, it is possible to leave a fairly large proportion of the solvent present in the dispersions according to the invention. However, for reasons of work safety and industrial hygiene, the solvent is preferably distilled off to such an extent that the flash points of the dispersion are above 100° C. After removal of the solvent, the aqueous dispersions are stable.

However, it is possible to prepare mixtures by mixing the fluorine-containing copolymers according to the invention and additional extenders, auxiliaries or other fluorine-containing copolymers in solution, followed by preparation of an aqueous dispersion, and/or by mixing dispersions containing fluorine-containing copolymers according to the invention and additional extenders, auxiliaries or other fluorine-containing copolymers.

The invention furthermore relates to the use of the aqueous dispersions according to the invention as finishing agents for texthe substrates, in particular for the treatment of carpet goods. The chemical nature of the substrates to be treated can be, for example, cellulose, cellulose derivatives, polyesters, polyamide and polyacrylonitrile and wool or silk, which are given oleophobic and hydrophobic properties by the dispersions according to the invention.

Application of the aqueous dispersions according to the invention to the substrates mentioned takes place by known processes, such as exhaust, padding, spraying or foaming processes, followed by a temperature treatment (120°–150° C.). The desired oleophobic and hydrophobic properties are achieved when lower amounts are used compared with finishing agents of the prior art.

Leather and mineral substrates, for example stone, can be finished in the same manner.

Likewise, the dispersions according to the invention can be used as paper auxiliary for the oleophobic and hydrophobic finishing of paper. Besides the use of paper auxiliaries known per se, e.g. agents for retention, wet-fastness and sizing, commercial starch can be employed. In comparison with a commercial oil repellent agent (e.g. $[CF_3—(CF_2)_7—SO_2—N(C_2H_5)—C_2H_4—O]—P(O)—ONH_4$, with trade-name Scotchban FC 807) the inventive dispersions exhibit remarkable advantages in the hydrophobic and oleophobic effects even in presence of hard tap water. The use of the inventive dispersions takes place according to known processes, e.g. by mass or surface impregnation.

EXAMPLE 1

In a reactor equipped with thermometer, stirrer and reflux condenser, a solution of 78.0 parts by weight of $CH_2=CHCOOCH_2CH_2C_nF_{2n+1}$ (mixture of n=8, 10, 12, 14), 4.0 parts by weight of methyl methacrylate, 15.0 parts by weight of $CH_2=CCOO(CH_2CH_2O)_8H$,

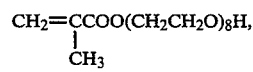

3.0 parts by weight of dimethylaminoethyl methacrylate and 1.0 part weight of n-dodecanethiol in 258.0 pans by weight of acetone.

is prepared.

The solution is first stirred at room temperature in a nitrogen atmosphere, 2.25 parts by weight of tert-butyl perpivalate (75% strength ) are added, and the mixture is maintained at 56° C. for 8 hours. After this time, the polymerisation is complete. A solution of 3.9 parts by weight of acetic acid in 286.0 pans by weight of deionised water is added at 50° C. to the polymer solution which is cooled to 50° C. over a period of 15 minutes. The mixture is stirred for 15 minutes, and the acetone is then removed at 60° C./200–300 mbar by distillation. This gives a stable polymer dispersion having a solids content of 25% by weight. The fluorine content of the copolymer is 45.4% by weight. The viscosity of the dispersion, measured at 25° C. using an Ubbelohde viscosimeter, is 29.3 cSt.

EXAMPLE 2

(Use; fishing and assessing of carpets)

Copolymer dispersions according to Example 1 are mixed with 60 parts by weight of an aqueous colloidal suspension of organosiloxanes as known extenders such as described in DE 3,307,420 and deionised water, in such a manner that the parts add up to 100.

A 1.0% strength aqueous dilution of this mixture is applied to a polyamide carpet (tufted material, pile weight: 500 g/m$^2$) in such a manner (spray application) that an add-on of 1.0% by weight of the above-mentioned mixture (relative to the pile weight) remains on the carpet.

A further application method is as follows: A polyamide carpet (tufted material, pile weight: 500 g/m$^2$) is impregnated with a 1.0% strength aqueous dilution of this mixture and squeezed off (padding process) in such a manner that an add-on of 1.0% by weight of the abovementioned mixture (relative to the pile weight) remains on the carpet.

It is then dried at 125° to 150° C. for 5 to 15 minutes, subjected to condensation, air-conditioned at 23° C. and 65% relative humidity for 24 hours, and the application tests were then carried out.

The results of the application tests can be seen from the following table.

Notes regarding the table:

1) According to AATCC test method 118 (5 is, for example, better than 4). The test liquids or mixtures for the test method are No. 1: nujol or paraffin oil DAB 8; No. 2: 65% by volume of nujol and 35% by volume of n-hexadecane; No. 3: n-hexadecane; No. 4: n-tetradecane; No. 5: n-dodecane; No. 6: n-decane; No. 7: n-octane: No. 8: n-heptane).

Resistance to penetration of the carpet by a water-/isopropanol mixture (water/isopropanol =20/80 is, for example, better than 30/70).

Droplets of water/isopropanol mixtures (90/10 to 10/90 ratio) are applied to the carpet. The test result corresponds to the mixture having the highest isopropanol content which remains unchanged on the carpet for at least 20 seconds and does not penetrate the carpet.

TABLE

| Copolymer according to Example | (Parts by weight) | Fluorine add-on (ppm) | Spraying process | | Padding process | |
|---|---|---|---|---|---|---|
| | | | Oleo-phobicity[1] | Hydro-phobicity[1] | Oleo-phobicity[1] | Hydro-phobicity[2] |
| 1 | 35 | 280 | 6 | 20/80 | 6 | 20/80 |
| 1 | 17 | 140 | 6 | 20/80 | 5–6 | 20/80 |
| 1 | 11 | 85 | 5–6 | 20/80 | 5 | 20/80 |

EXAMPLE 3

The monomers given in the following Table are copolymerised in the manner given in Example 1.

| Monomer | Parts by weight |
|---|---|
| CH$_2$=CHCOOCH$_2$CH$_2$C$_n$F$_{2n+1}$ (mixture of n = 8, 10, 12, 14) | 70 |
| CH$_2$=C(CH$_3$)COO(CH$_2$CH$_2$O)$_8$H | 20 |
| Styrene | 4.2 |
| Acrylonitrile | 2.8 |
| Dimethylaminoethyl methacrylate | 3.0 |
| Solids content [% by weight] | 24.63 |
| Fluorine content in the solid [% by weight] | 41.1 |
| Viscosity [cSt/°C.] | 46.2/25 |

Thee dispersion prepared according to Example 1 is suitable for the oleophobic finishing of texthes, for example table linen and protective work clothing, and imparts a very good dirt removability to the finished texthes.

EXAMPLE 4

This Example shows the good applicability of the novel auxiliaries for the oleophobic and hydrophobic finishing of paper.

According to Example 1 the monomers listed in the following table are transformed into an aqueous dispersion.

| Monomers | % by weight |
|---|---|
| CH$_2$=CH—COO—CH$_2$CH$_2$C$_n$F$_{2n+1}$ (mixture of n = 8, 10, 12, 14) | 73 |
| CH$_2$=C(CH$_3$)—COO—(CH$_2$CH$_2$O)$_8$H | 15 |
| methyl methacrylate | 9 |
| dimethylaminoethyl methacrylate | 3 |
| solids content [% b.w.] | 24.45 |
| fluorine content in the solid [% b.w.] | 42.4 |
| viscosity [cSt/°C.] | 23.3/25 |

EXAMPLE 5

(Application: Finishing and Judgment of Paper)

This Example shows the good applicability of the novel auxiliaries for the oleophilic and hydrophobic finishing of paper.

The following kind of paper was used:
50 parts of bleached cellulose of conifers,
50 parts of bleached cellulose of leaved trees,
10% of clay ash,
grade of grinding: 35° SR,
pH-value 7.2,
specific mass: 80 g/m$^2$.

The finishing of the papers was carried out on a laboratory sizing press (Type HF of Mathis Comp., Zurich/Switzerland). As impregnating liquor, a 5% by weight solution of commercial potatoe starch (Perfectamyl A 4692 of Avebe Comp.) and a certain amount of the auxiliary to be tested (vide the following table) in deionized water and tap water of 17° German Hardness (G.M.), respectively, was used. The wet absorption was about 80%. Drying was carried out in a drying cylinder at 90° C. for 1 min. Then the papers were conditioned at room temperature for 2 h.

Judgment of hydrophobia: Take-up of water according to the Cobb method (DIN 53 132) at a testing time of 60 sec. was determined.

Judgment of oleophobia: according to the Cobb method as above, however, with the use of turpentine oil instead of water, as the test liquor.

The hydrophobic and oleophobic effect of the inventive auxiliary are listed up in the following table. In comparison with a commercial oleophobic agent there are remarkable advantages in the oleophobic efficiency especially in the presence of hard tap water.

Table to Example 5

| Agent | Solids (% b.w.) | Dilution Water | Starch (% b.w.) | Water Take-Up (g/m²) Cobb 60 | Oil Take-Up (g/m²) Cobb 60 |
|---|---|---|---|---|---|
| Expl. 4 | 0.25 | Tap Water (17° G.H.) | 5 | 19.7 | 5.0 |
| | 0.50 | Tap Water (17° G.H.) | 5 | 18.4 | 3.0 |
| Scotchban FC 807 | 0.25 | Tap Water (17° G.H.) | 5 | >80 | >30 |
| | 0.50 | Tap Water (17° G.H.) | 5 | >80 | >30 |
| | 0.50 | Deionized Water | 5 | >80 | 2.8 |

What is claimed is:

1. Fluorine-containing copolymers and aqueous dispersions prepared therefrom containing 5 to 50% by weight, relative to the total weight of the dispersions, of ingredients other than water (solids content), it being possible for the mixture to contain additionally extenders known per se for texthe auxiliaries, wherein the copolymers contain copolymerized comonomers incorporated by polymerisation in the following percentages by weight, relative to the total weight of the copolymers:

a) 60–90% by weight of perfluoroalkyl-containing (meth)acrylates of the formula $$C_nF_{2n+1}-X-O-CO-CR^1=CH_2 \quad (I),$$

b) 1 to 35 of monomers of the formula $$CH_2=CR^4-COO-R^5 \quad (II)$$

and/or styrene, acrylonitrile, vinyl acetate or vinyl propionate, c) 4 to 25% of monomers of the formula $$CH_2=CR^6-COO-(CH-CH_2O)_p-R^8 \quad (III)$$
$$\phantom{CH_2=CR^6-COO-(C}|\phantom{H-CH_2O)_p-R^8}$$
$$\phantom{CH_2=CR^6-COO-(}R^7$$

whereby b) and c) together constitute at least 6% by weight, d) 1 to 15% of monomers of the formula $$CH_2=CR^{11}-COOCH_2CH_2-N(R^9,R^{10}) \quad (IVa)$$

or, in quaternised form, of the formula $$[CH_2=CR^{11}-COO-CH_2CH_2-N(R^9,R^{10},R^{12})]^{\oplus}Y^{\ominus} \quad (IVb)$$

or, in N-oxidised form, of the formula $$CH_2=CR^{11}-COO-CH_2CH_2-N(R^9, R^{10}) \quad (IVc)$$
$$\phantom{CH_2=CR^{11}-COO-CH_2CH_2-N}\downarrow$$
$$\phantom{CH_2=CR^{11}-COO-CH_2CH_2-N}O$$

in which formulae
n represents a number from 4 to 16,
X represents —($-CH_2-$)$_m$—, —$SO_2$—$NR^2$—$CH_2$—$CHR^3$— or —O—($-CH_2-$)$_m$—, m denoting a number from 1 to 4,
$R^1$, $R^3$, $R^4$, $R^6$, $R^7$ and $R^{11}$ represent, independently of one another, hydrogen or methyl,
$R^2$, $R^9$, $R^{10}$ and $R^{12}$ denote, independently of one another, $C_1$–$C_4$-alkyl,
$R^5$ represents a $C_1$–$C_{22}$-alkyl,
$R^8$ denotes hydrogen or $C_1$–$C_8$-alkyl,
p represents a number from 1 to 50, and
Y represents an equivalent of a mono- to trivalent anion.

2. The aqueous dispersions of claim 1, containing 10 to 40% by weight, relative to the total weight of the dispersions, of ingredients other than water.

3. The fluorine-containing copolymers of claim 1, wherein b) and c) together constitute at least 8% by weight.

4. The fluorine-containing copolymers of claim 1, wherein the index p represents a number of 3–25.

5. The fluorine-containing copolymers of claim 1, wherein n represents a number from 6–14.

6. The fluorine-containing copolymers of claim 1, wherein the percentages are
65–90% by weight of component a),
1–20% by weight of component b),
4–25% by weight of component c) and
1–10% by weight of component d),
wherefrom those of U.S. Pat. No. 5,247,008 are disclaimed.

7. The fluorine-containing copolymers of claim 6, wherein the percentages are
>75–90% by weight of component a),
1–<20% by weight of component b)
4–20% by weight of component c) and
1–10% by weight of component d).

8. The fluorine-containing copolymers of claim 7, wherein the percentages are
>75–85% by weight of component a),
1–18% by weight of component b),
5–15% by weight of component c) and
1–10% by weight of component d).

9. The fluorine-containing copolymers of claim 6, wherein the percentages are
65–90% by weight of component a),
1–<10% by weight of component b),
4–25% by weight of component c) and
1–10% by weight of component d).

10. The fluorine-containing copolymers of claim 6, wherein the percentages are
65–85% by weight of component a),
1–<10% by weight of component b),
5–18% by weight of component c) and
1–10% by weight of component d).

11. The fluorine-containing copolymers of claim 1, wherein in monomers of the formula (I), m adopts a value of 2 and $R^1$, independently thereof, denotes hydrogen.

12. The fluorine-containing copolymers of claim 1, wherein in monomers of the formula (II), $R^5$ denotes methyl, ethyl, propyl, butyl, hexyl, octyl, stearyl or behenyl.

13. The fluorine-containing copolymers of claim 1, wherein $R^5$ represents $C_1$–$C_8$-alkyl.

14. The fluorine-containing copolymers of claim 1, wherein in monomers of the formula (III), $R^7$ denotes hydrogen and p, independently thereof, denotes a number from 3 to 25.

15. The fluorine-containing copolymers of claim 14, wherein the index p denotes a number from 5 to 9.

16. The fluorine-containing copolymers of claim 1, wherein in the monomers of the formulae (IVa), (IVb) or (IVc), the radicals $R^9$ and $R^{10}$ denote methyl and, independently thereof, Y is chloride, acetate, ½ sulphate, aryl- or alkylsulphonate or ⅓ phosphate.

17. The fluorine-containing copolymers of claim 16, wherein Y is chloride, acetate or ⅓ phosphate.

* * * * *

UNITED STATES PATENT AND TRADEMARK OFFICE
CERTIFICATE OF CORRECTION

PATENT NO. : 5,387,640
DATED : February 7, 1995
INVENTOR(S) : Michels, et al.

It is certified that error appears in the above-indentified patent and that said Letters Patent is hereby corrected as shown below:

Col. 9, line 24    Delete " texthe " and substitute
                   -- textile --

Signed and Sealed this

Twenty-fifth Day of April, 1995

Attest:

BRUCE LEHMAN

*Attesting Officer*    *Commissioner of Patents and Trademarks*